Patented Feb. 16, 1932

1,845,271

UNITED STATES PATENT OFFICE

OTTO HERMANN, OF CHICAGO, ILLINOIS, ASSIGNOR, BY MESNE ASSIGNMENTS, TO THERMO ELECTRIC COMPANY, OF ST. LOUIS, MISSOURI, A CORPORATION OF MISSOURI

THERMOCOUPLE

No Drawing.   Application filed March 16, 1929.   Serial No. 347,742.

My invention relates to thermocouple and more particularly to a thermoelectric element consisting of an alloy containing three metallic elements.

It is the purpose of this invention to provide a thermocouple which is adapted to convert heat energy more efficiently into electrical energy at a lower difference of temperature than is generally the case with this method of generating electric current.

It is also an object of my invention to provide an efficient thermocouple, the elements of which consist of relatively cheaply produced metal alloys composed of such metallic elements which are abundant and readily available.

The most efficient alloy for my new thermoelectric element is composed by weight of .6225 to .64 antimony, .3525 to .37 zinc and .0075 to .015 vanadium. A thermocouple formed from this element and another element consisting of an alloy of .55 copper and .45 nickel produces an electromotive force approaching .085 volts at a difference of temperature between the junctions as low as 300° C. The current in such a thermocouple flows from the copper-nickel element over the hot junction to the alloy metal of antimony, zinc and vanadium so that, in conformity with the rule generally applied, the former alloy is here designated as the positive element and the latter alloy as the negative element of the thermocouple.

To avoid evaporation of zinc due to overheating I do not prepare the negative alloy metal by the method of melting the component metallic elements together at the same time. I prefer to add the small predetermined quantity of vanadium to the melted antimony in which it dissolves. Then, I add the zinc to the melted antimony-vanadium mixture which readily alloys with it. The alloy thus produced is very hard, fairly strong and not too brittle for an alloy of this nature to be used for practical thermoelements in casted form. It was found that the alloy is easily produced if the quantity of vanadium contained in its does not exceed 1.5%. To produce the alloy with a larger vanadium content is more difficult and necessitates an increase of the temperature of the melted antimony to which the vanadium is added. The melting point of the alloy is around 600° C., and it rises in proportion with the increase of the quantity of vanadium contained in it.

In addition to the properties already referred to, the negative alloy has also a very low thermal conductivity and an electric conductance in comparison therewith sufficiently high to permit the flow of a relatively large current.

Because of the fact that the physical properties of the negative alloy are so widely different from those of the positive metal, the two elements cannot be joined together to form thermocouples by the method of brazing or electric welding. I have found by experimentation that satisfactory thermocouple joints can be obtained by casting the negative element material around the end portion of the positive elements having wire or ribbon form. Preceding this process, however, I cover the positive element with a thin layer of the negative alloy at the place where it will be united with the same by casting. If this is not done, the positive element will make an imperfect contact with the alloy of antimony, zinc and vanadium resulting in a high contact resistance which materially reduces the output and the efficiency of the thermocouple as experience has shown.

To cover the positive element on one or both extremities with a film of the negative alloy, I prefer to heat them on their ends by means of a Bunsen burner to a bright red heat after dipping them in their ends into a borax flux to remove or reduce the oxide which may have been formed thereon. Then, while heated to this temperature, I dip them into a melt composed of a mixture of antimony, zinc and vanadium which penetrates in minute quantities beneath their surface and forming a firmly adhering film of the negative alloy metal on their ends. This film, acquiring a thickness of a fraction of a millimeter, remains fixed on the positive elements after their removal from this melt. In this condition the positive elements will be organically united with the negative elements to form thermocouples. During this process the negative alloy metal, being in a melted condition, is caused to flow around the end portion of the positive elements to effect its unification there with the film of negative metal which has been previously formed thereon in the manner described.

In joining the elements to form thermocouples by the method hereinbefore described, the fact has been established in the course of experimentation that very little contact resistance is produced by such joints in addition to the inherent ohmic resistance of the two metals. Moreover, it was also found that thermocouples thus produced have a long useful life; their joints are not impaired when heated to temperatures up to and below 420° C.

I claim:

1. A negative thermoelectric element consisting of an alloy composed of 62% to 64% antimony, 35% to 37% zinc and .75% to 1.5% vanadium.

2. A negative thermoelectric element composed of an alloy of antimony, zinc and vanadium.

3. A thermocouple, the positive element of which consists of an alloy of 55% copper and 45% nickel and the negative element of an alloy of antimony, zinc and vanadium.

OTTO HERMANN.